C. & J. G. ROWLAND.

Machine for Making Compressed Peg-Strips.

No. 6,299. Reissued Feb. 16, 1875.

Attest:
M. Gardner.
Edw. W. Dorn

Inventor:
Benjamin F. Sturtevant
Assee of C. & J. G. Rowland
per Crosby & Gregory Atty

THE GRAPHIC CO. PHOTO-LITH. 39 & 41 PARK PLACE, N.Y.

UNITED STATES PATENT OFFICE.

CHARLES ROWLAND AND JOSEPH G. ROWLAND, OF QUINCY, ILLINOIS, ASSIGNORS, BY MESNE ASSIGNMENTS, TO BENJAMIN F. STURTEVANT, OF BOSTON, MASSACHUSETTS.

IMPROVEMENT IN MACHINES FOR MAKING COMPRESSED PEG-STRIPS.

Specification forming part of Letters Patent No. 68,006, dated August 20, 1867; reissue No. 6,299, dated February 16, 1875; application filed February 10, 1875.

*To all whom it may concern:*

Be it known that CHARLES ROWLAND and JOSEPH G. ROWLAND, of Quincy, in the county of Adams and State of Illinois, invented a certain new and improved compressed peg or peg-strip, a mode or process of manufacturing pegs or peg-strips, and also a machine for making the said pegs or peg-strips; and the following is a full, clear, and exact description thereof, reference being had to the accompanying drawings making part of this specification, and to the letters of reference marked thereon, like letters indicating like parts wherever they occur.

The following description will enable others skilled in the art to carry out the invention.

This invention relates to an improvement in mechanism for condensing or consolidating pegs or peg-strips, to a process or method of manufacturing pegs or peg-strips, and to a condensed peg-strip, substantially as hereinafter described.

This invention has special reference to a condensed peg-strip of leather or wood, and irrespective of the particular form given the peg-strip, as the strip of peculiar form forms the subject of another patent, the application for which was filed of even date with the filing of the application on which Patent No. 68,006 was granted, to form the peg-strip suitable for use in the manufacture of boots, shoes, and similar articles, the leather or wood forming the strip is submitted to a process of condensation by compression.

This may be accomplished in a variety of ways, according to the manner in which it is intended to use the peg-strip. Those intended for what is denominated custom-work, or that in which each peg is driven singly by hand or otherwise, are made into separate pegs, while those intended for use in machine-work are formed in a continuous series of pegs slightly joined at their edges; or they may be made in the form of a continuous strip, to be afterward cut into separate pegs, as is customary in the production of wooden pegs used in machines.

Figure 1:
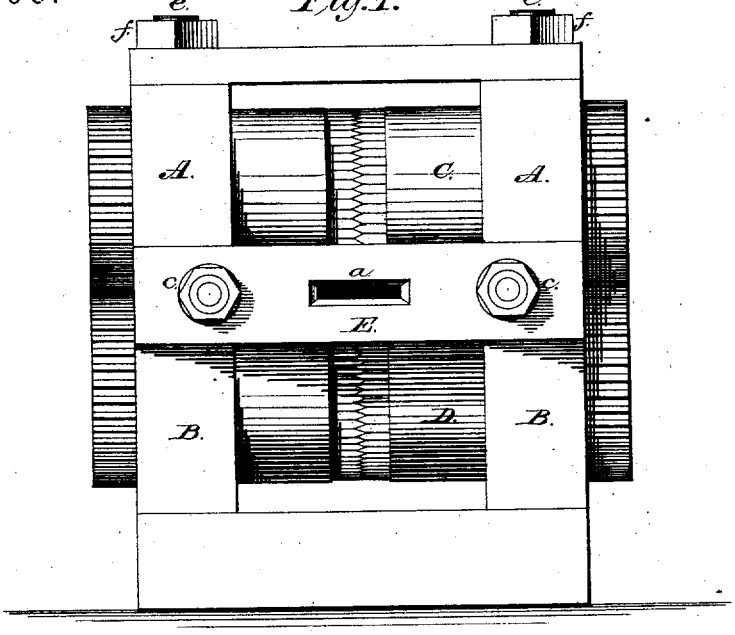
Figure 2:
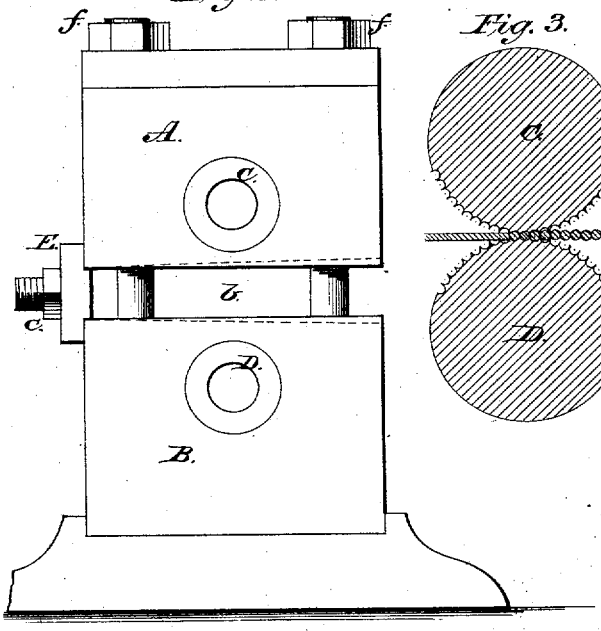
Figure 3:
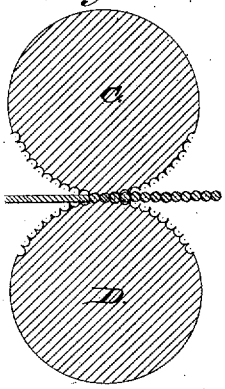
Figure 4:
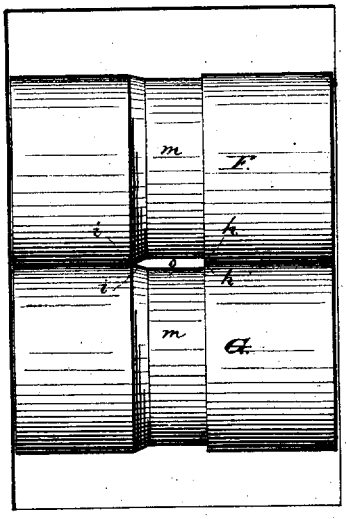

Figure 1 represents a front elevation, and Fig. 2 an end elevation, of a machine for making the pegs singly, or in a series as a strip. Fig. 3 represents a cross-section of the compressors, and Fig. 4 represents a modification of the compressors for making the pegs into a strip.

Two strong metal compressors, C D, are prepared by cutting, or otherwise forming, on their faces a series of recesses or indentations of proper form and size to correspond with the shape and size that it is intended to give to the peg-strips. These recesses are cut on each compressor, so as to form a die or mold of one-half of the size of the peg-strip when finished, so that when the two compressors, placed opposite each other, are brought together the recesses in the two shall form a complete die of the exact size and form that it is intended to give to the peg-strip, as shown in cross-section in Fig. 3. These recesses are made longitudinally on the compressors side by side, so as to form a series extending entirely around the compressors, as represented in Fig. 1, there being in this case two series in the compressors, the point of one series interlocking with those of the other series, so as to form two series of pegs at once, as represented in Fig. 1.

It is obvious that, if desired, any number of series may be thus arranged on the compressors, so as to cover their entire surface, if desired.

These compressors, thus made, are mounted in a strong frame, consisting at each end of strong blocks A and B, which form bearings for sustaining the compressors during their movement.

The blocks A B are held together by strong vertical rods *e*, which are provided with nuts *f* at their upper ends, by which the blocks, with their compressors, may be adjusted, as desired. Between the blocks A and B, on each side, is placed a wedge, *b*, sliding in suitable grooves in the adjoining edges of the blocks. The ends of said wedges have a screw formed thereon, and are provided with nuts *c*, as shown in Fig. 2, so that by loosening the nuts *f* and screwing up the nuts *c* the compressors may be adjusted with relation to each other, when necessary. These compressors are made hollow, for the purpose of admitting steam, or otherwise heating them, if desired. Upon the side of the frame is secured a cross bar or plate, E, through which an opening, *a*, is made, as shown in Fig. 1, through which to feed the strip to the compressors, there being a guide extending from the bar E to the compressors, to guide the strip accurately to the compressors or dies, and to insure its passing between the compressors in a proper manner. The compressors are shown as provided with gear-wheels, to insure the accurate movement of the compressors, these gears of course being so adjusted as to cause the dies or recesses in the compressors to come exactly opposite each other, as represented in Fig. 3.

When thus arranged, the compressors are set in motion, and a strip of leather or wood is fed through the mouth *a* between the compressors, which, as they move, compress the strip and force it into the dies, thereby greatly compacting or condensing it, and at the same time pressing and cutting it, if desired, into a continuous series of pegs, which will be delivered at the opposite side of the compressors ready for use; but this peculiar form of peg-strip is not claimed in this application, as it forms the subject-matter of Letters Patent No. 68,005. If leather is used it is moistened previous to being put through the machine.

If it be desired to form single pegs, the compressors will be so adjusted as to bring the edges of the dies into direct contact, so that, as the pegs are compressed in the cells or recesses, they will at the same operation be entirely severed.

When, however, it is desired to form the pegs in continuous series and have them slightly united for use in machines, then the compressors will be slightly separated, so as to leave a thin film or uncut portion between each of the adjoining pegs. When thus formed they may be coiled into a roll and used the same as the coiled wooden strip is now used in machines, and a series of pegs united by a thin film is not herein claimed, but is subject-matter of Patent No. 68,005.

Fig. 4 represents a pair of compressors, in which, instead of a series of cells or recesses, as above described, there is formed a continuous depression, so that the depressions in the compressors, when placed opposite each other, form an opening corresponding in form and size to a longitudinal central section of a finished peg, as represented at *o*. By passing a strip of suitable width between these compressors F G, it will be compressed into a condensed strip, the cross-section of which will be of the size and form of the opening *o*.

This strip, when thus prepared, may be used the same as the coiled wooden peg-strip is now used, the machine cutting from the strip a peg at each operation of the driver.

It is obvious that, instead of the compressors, as shown, flat dies or compressors may be used on the same plan that dies are now used for forging or shaping metals; or that the dies or compressors may be so arranged as to slide to and fro—one or both. In the case of leather it is preferably used in its usual state, the compressing to which it is subjected condensing it to such a degree as to render the pegs thus formed sufficiently rigid to enable them to be driven similarly to the ordinary wooden peg.

In case, however, it be desired to use soft or spongy leather, then it is proposed to prepare the leather by first saturating it with any suitable solution, such as shellac, or the insoluble cement used for uniting leather; and in all cases it may be desirable to first compress the leather by passing it between rolls previous to submitting it to the operation of the dies.

It is obvious that the pegs may be made round, square, diamond-shaped, or of any required form, by simply forming the dies of the requisite shape; and, although this process and mechanism are specially adapted to form the newly-invented leather peg subject of Patent No. 68,005, the same process and mechanism may be used to form peg-strips of other material—as, for instance, of wood—strips of peg-wood being run through the machine between the heated compressors, and being previously steamed, if desired. The pegs are thereby so compressed as to occupy small space when driven, and when wet thereafter they will so swell or increase in diameter as to fill the hole more perfectly and hold the parts more tightly together.

If the compressors shown in Figs. 1 and 3 operate on the strip, the strip will appear as if ribbed; but if the strip is compressed between compressors such as are shown in Fig. 4, and having shoulders *h* for guiding that edge of the strip which is to form the head, and having beveled edges *i i* for operating on the opposite edge of the strip, or that edge which is to form points, and having plain sides *m*, it is evident that the strip, when compressed, will have flat sides and a beveled and a square edge, or will have the shape of the ordinary wooden peg-strip.

It is not desired to limit this invention to the special devices herein described; but,

Having thus described the improved process of making pegs and peg-strips, and also several devices for accomplishing the result, what is claimed as the invention of the said CHARLES ROWLAND and JOSEPH G. ROWLAND is—

1. Compressors for compressing a peg-strip, having recesses or dies, and adapted to compress or consolidate the peg-strip, substantially as described.

2. That improvement in the art or process of manufacturing pegs or ribbon peg-strips consisting of compressing the peg-strip between heated compressors, thereby condensing the pegs or peg-strip, substantially as described.

3. As a new article of manufacture, a compressed ribbon peg-strip, of leather or its described equivalent.

4. Grooved heated compressors, combined and acting to compress a peg or peg-strip, substantially as described.

BENJ. F. STURTEVANT.

Witnesses:
G. W. GREGORY,
E. C. WEAVER.